April 7, 1964     A. G. SCHILBERG     3,128,365
METHOD FOR REINFORCING METAL STAMPINGS
Filed Dec. 15, 1961
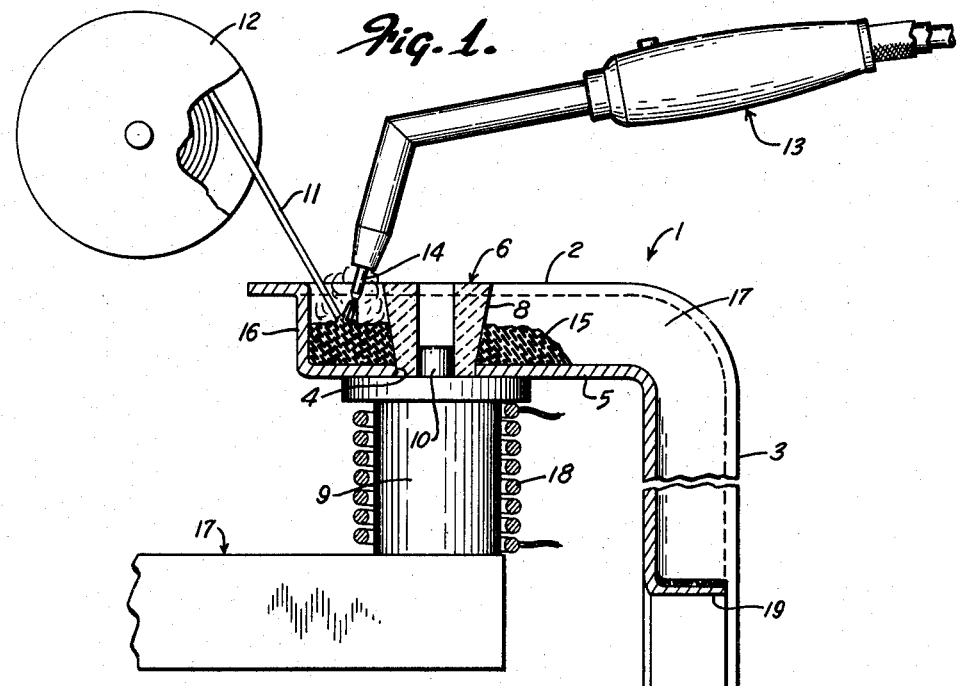
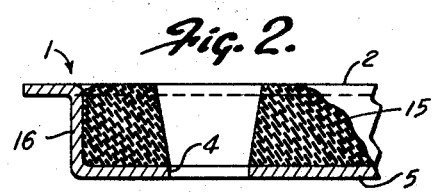
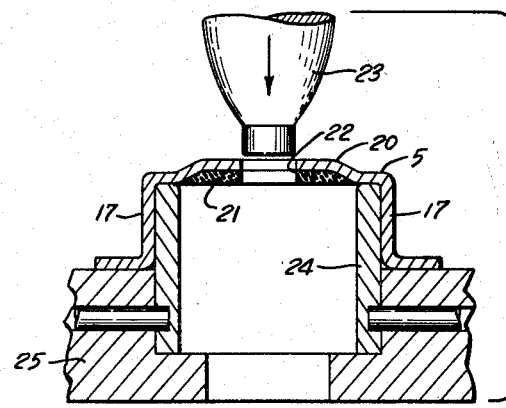
INVENTOR
ARNOLD G. SCHILBERG, DECEASED
BY IRENE G. SCHILBERG
ADMINISTRATRIX
BY    Andrus & Starke
ATTORNEYS

United States Patent Office 3,128,365
Patented Apr. 7, 1964

3,128,365
METHOD FOR REINFORCING METAL STAMPINGS
Arnold G. Schilberg, deceased, late of Milwaukee, Wis., by Irene G. Schilberg, administratrix, Milwaukee, Wis., assignor to A. O. Smith Corporation, Milwaukee, Wis., a corporation of New York
Filed Dec. 15, 1961, Ser. No. 160,428
8 Claims. (Cl. 219—76)

This invention relates generally to a method for reinforcing sheet metal stampings and particularly relates to a method for locally reinforcing and building-up preselected areas of a stamping.

There are many applications of lightweight metal stampings which require that the stamping have a thickness in certain areas thereof over and above the general requirements of the stamping as a whole. Such additional thickness might be required, for example, in attachment and bearing areas of the stamped part to provide the necessary strength and rigidity values thereat and/or in those areas which are to be extruded, flanged or bossed to provide the necessary thickness and length in the extrusion, etc.

Heretofore, it has been common to meet these requirements by forming the stamping in its entirety of sheet metal of the gauge required for these critical areas, thus incurring an overall material penalty and unduly raising the cost of the stamped part. An alternative practice has been to weld cast fused metal plugs or blocks to the area requiring added thickness. This practice was somewhat costly too, particularly for fabricators who had no foundry and were required to purchase the plugs from outside.

The present invention is directed to a method for building-up local areas of metal stampings by depositing molten metal directly onto the preselected areas of the stamping.

In accordance with the invention, a consumable filler wire preferably of the same composition as the stamping is fed to the area of the stamping to be reinforced in the presence of welding or melting heat which is preferably provided by an electric arc struck between the stamping and the wire or a separate electrode. The molten wire material is allowed to fall onto the stamping where it solidifies to provide a built-up metal portion, the thickness and shape of which is varied by controlled movement of the wire back and forth over the area being reinforced. Preferably, a suitable non-oxidizing atmosphere is provided in the region of the arc to insure a high quality weld deposit and a strong union between the melt and the parent metal of the stamping.

The stamping may be preformed to provide a suitable sump or pocket for the molten filler metal or expandable, non-metallic molds may be employed to help shape the deposit and reduce total wire requirements.

By the method of the invention, it is possible to provide the exact metal thickness needed at any particular area of the stamping more simply and inexpensively than heretofore possible. Anyone having conventional welding equipment may practice the present method, thus offering the metal fabricator practically unlimited opportunities in designing stamped parts which prior thereto might have been prohibitive from an economical viewpoint.

The drawing furnished herewith illustrates the best mode presently contemplated of carrying out the invention.

In the drawing:

FIG. 1 is a schematic illustration of structure for carrying out the method of the invention as applied to a sheet metal stamping in two different areas thereof with the stamping being partly in section for clarity of illustration;

FIG. 2 is an enlarged, fragmentary sectional view of one of the reinforced areas of the stamping in completed form; and FIG. 3 is a fragmentary, enlarged cross-section of the other reinforced area of the stamping prior to the area being extruded with extrusion apparatus shown therewith.

Referring to the drawing, the method of the invention is illustrated in connection with a sheet metal steering knuckle 1 for use in an independent wheel suspension system of a vehicle. Knuckle 1 has a generally hat-shaped sectional area and includes an upper end portion 2 adapted to be connected to the upper control arm (not shown) of the suspension and a center, vertical portion 3 adapted to support a wheel spindle (not shown).

The method of the invention is described initially in connection with the reinforcing of knuckle end portion 2. An opening 4 is initially provided in the bottom wall or web 5 of the stamping and a suitable disposable core 6 of non-metallic material such as ceramic is then fixed in the opening by a fixture 7 to provide a form for the reinforcing metal. In the illustrated construction, core 6 is shown as having a tapered external surface 8 so as to form a tapered assembly opening in the final form of knuckle to effect wedging engagement with a correspondingly tapered stud (not shown) carried by the upper control arm. Fixture 7 includes a circular support arm 9 having a radially reduced upper end 10 which fits within opening 4 and core 6 to thus hold the latter rigidly in place.

The reinforcing metal is supplied to the knuckle stamping in the form of a consumable filler wire 11 contained on a reel 12. Wire 11 is preferably of the same composition as the parent metal of the stamping to insure a uniformly strong reinforced structure and compatability between the wire and the parent metal of the stamping. In actual practice, the wire and stamping have been composed of a suitable steel alloy with satisfactory results.

The wire 11 is directed into the knuckle end portion 2 in the presence of a melting or welding heat furnished by any suitable welding apparatus such as the helium, arc welding torch 13 illustrated. Torch 13 has a tungsten electrode 14 which provides an electric arc when struck against and withdrawn from stamping 1 and is constructed to provide an envelope of helium gas to the arc to provide a non-oxidizing atmosphere for producing a high quality strong bond between the filler and stamping metals.

In carrying out the invention, an electric arc is struck between electrode 14 and stamping end portion 2 whereupon the flow of shielding gas is started and wire 11 advanced to the arc where it melts and falls or drops into the stamping. Wire 11 is moved back and forth in circular fashion over the stamping by any suitable manual or automatic means and as it solidifies it forms a built-up, layer-like metal deposit 15.

The envelope of helium provided by torch 13 insures the provision of a high strength bond between successive layers of the deposit as well as between the layers and the surrounding portions of stamping 1.

It will be appreciated that core 6 serves to accurately shape the center of the deposit in the manner desired for receiving the ball joint stud. Similarly, an end wall 16 of stamping 1 and the opposed side walls 17 confine or shape the deposit in their respective portions of stamping 1. In the illustrated method, the portion of the stamping to the right of core 6 in FIG. 1 is left open but as the molten metal tends to solidify quickly, it is possible to exercise fairly close control over the shape along the corresponding edge of deposit 15. If preferred, however, a ceramic plate (not shown) may be fixed across this particular part of end portion 2 to produce a true or straight edge along the end of the deposit.

The wire 11 is continued to be fed to stamping 1 and repeatedly moved back and forth until the depth of deposit 15 equals the depth of the end portion 2. In actual practice, deposit 15 is preferably crowned off above the level of the top of the end portion 2 and then ground smooth to produce a neat, finished appearance in end portion 2.

Core 6 is split apart and removed from deposit 15 in a final step of the process.

It is preferred to heat stamping end portion 2 independent of the heat generated by the electric arc to prevent excessive stress and distortion of the stamping as the deposit is being formed. To this end, a proximity coil 18 is shown encircling fixture arm 9 closely adjacent the bottom of end portion 2. Coil 18 is connected to a suitable source of alternating current (not shown).

The metal deposit 15 serves to increase the strength and rigidity of knuckle end portion 2 enabling it to safely handle and withstand the added stresses imposed thereon by reason of the control arm-to-steering knuckle attachment being effected therethrough. This is accomplished without incurring any material penalty in the knuckle, enabling a lightweight and inexpensive construction for the latter.

In the case of the vertical spindle receiving portion 3 of the knuckle, the present method is employed to provide extra metal thickness for forming an extruded flange 19 which is adapted to support the wheel spindle. In this instance, the particular portion of the stamping to be extruded is initially provided with a depressed portion 20 in the corresponding section of web 5 (see FIG. 3). Portion 20 forms a sump or pocket for containing the molten reinforcing metal which is introduced therein to form the deposit 21 in exactly the same manner described in connection with the reinforcing of end portion 2. The deposit 21 and web 5 in this instance are bored to provide a pilot opening 22 for the subsequent extrusion process to be performed thereon.

This extrusion may be carried out by a punch 23 and a cooperating female die 24 held in the bed 25 of the extrusion press by any known means. Stamping 1 is disposed in an inverted position on die 24 and the punch 23 is then moved downwardly into opening 22 to press the metal around the latter outwardly against the interior of die 24 to provide the extrusion or flange 19.

In this application, the added thickness of the stamping provided by deposit 21 enables an increased length and wall thickness in flange 19 which, in turn, provides an overall stronger bearing support for the wheel spindle in the knuckle. At the same time, the gauge of stamping 1 may be kept comparatively light in the main.

The present method has many applications to stampings other than the specific ones described and illustrated herein and which will be readily apparent to those skilled in the art of metal forming. Thus, for example, the present invention can be employed to build up particular areas of the stamping other than in the attachment and bearing areas simply to reinforce an otherwise weak portion thereof.

It is also contemplated to vary the cross-sectional area of the filler wire to control the shape and form of the metal deposit. Thus, for example, a tubular, consumable electrode may be employed to provide an annular deposit in or on the stamping corresponding in diameter to the electrode diameter. Similarly, if a long, wide deposit is required to be laid such as along a frame side rail, a ribbon electrode corresponding in length to the width of the rail may be utilized so that a single pass of the electrode will provide the desired metal build-up or deposit.

The invention is simple and inexpensive as it may be practiced without resort to conventional casting operations or the like. At the same time, the reinforcement provided by the invention compares favorably in final strength and rigidity with cast fused plug-type reinforcements.

Various modes of carrying out the invention are contemplated as being within the scope of the following claims particularly pointing out and distinctly claiming the subject matter which is regarded as the invention.

It is claimed:

1. A method of producing a built-up annular metal layer in a sheet metal stamping and around an opening provided therein consisting of the steps of fixedly positioning a non-metallic core in the said opening, continuously advancing a consumable filler wire to said stamping at said opening while providing said wire with melting heat to form molten wire material, directing said wire continuously around said core to build-up a solid metal deposit on said stamping and around said core, and removing said core from said opening to provide the annular metal deposit.

2. A method of locally reinforcing a sheet metal stamping comprising the steps of forming the stamping with a sump-like depression in each of the regions thereof to be reinforced, advancing a length of filler metal to the stamping in each of the said regions in the presence of an electric arc of sufficient intensity to melt said filler metal and directing the molten filler material into each of the sump-like depressions in said stamping to form metal deposit thereon and thereby reinforce said stamping while moving said filler material in a predetermined manner over said stamping to provide a preselected shape and thickness of metal deposit consistent with the degree of reinforcement desired.

3. The method of forming a sheet metal stamping having local reinforcement in one or more predetermined areas thereof which consists of the steps of pressing a metal sheet of given gauge to the general configuration desired, advancing a length of consumable filler metal to each of the areas of the stamping requiring local reinforcement in the presence of an electric arc of sufficient intensity to melt said filler metal and directing the molten filler metal onto the areas of the stamping to be reinforced while simultaneously moving said filler metal in a predetermined manner over the said areas to provide a metal deposit of preselected shape and thickness thereat.

4. The method of claim 3 including the step of forming said metal sheet with a depression in each of the areas thereof to be reinforced prior to advancing the filler material thereto to provide a retaining pocket for the molten filler metal.

5. The method of claim 3 including the step of positioning a disposable core of predetermined cross-section on the metal sheet in each of the areas requiring reinforcing prior to advancing the filler metal thereto to provide means for shaping the molten metal on said sheet.

6. The method of forming a sheet metal stamping having a flanged opening therein constituting a bearing or the like for said stamping, consisting of the steps of forming a metal sheet to the configuration desired in the final stamping including providing a pilot opening in the sheet in the area where the bearing is desired, feeding a consumable filler wire to the metal sheet in the area of said pilot opening while providing an electric arc between said wire and sheet to melt said wire, directing the molten filler wire material in a predetermined manner over said metal sheet to build-up a solid metal deposit of preselected shape and thickness on said sheet around said pilot opening, and subsequently extruding said pilot opening to form a flange of the requisite length with said metal deposit serving to provide added thickness in the flange and increased rigidity and strength to the final stamping as a whole.

7. The method of claim 6 including the step of forming the metal sheet with a sump-like depression in the region of said pilot opening prior to advancing the filler wire thereto to aid in retaining the molten wire material in said sheet.

8. The method of claim 6 which includes the steps of inserting a non-metallic core of predetermined shape and size in said pilot opening of said sheet prior to advancing the consumable filler wire to the sheet to aid in shaping the metal deposit and removing said core prior to performing the extrusion.

References Cited in the file of this patent
UNITED STATES PATENTS

| | | |
|---|---|---|
| 1,156,471 | Stoody et al. | Nov. 18, 1924 |
| 1,863,935 | Schmidt et al. | June 21, 1932 |
| 2,299,747 | Harter | Oct. 27, 1942 |
| 2,303,046 | Havlick | Nov. 24, 1942 |